Jan. 13, 1970    J. D. THOMPSON    3,488,895
METHOD FOR SURFACING GLASS
Filed May 29, 1967
FIG. 1
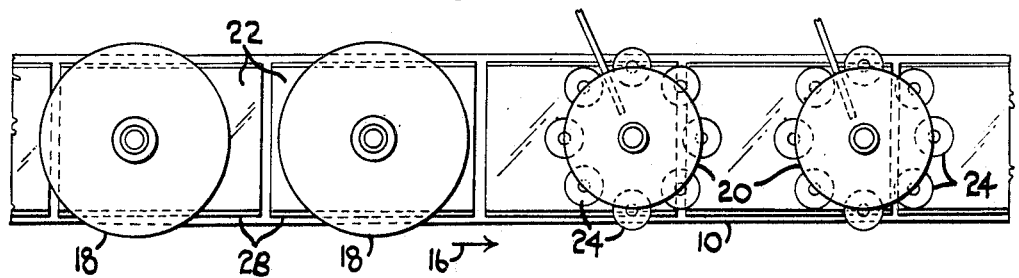
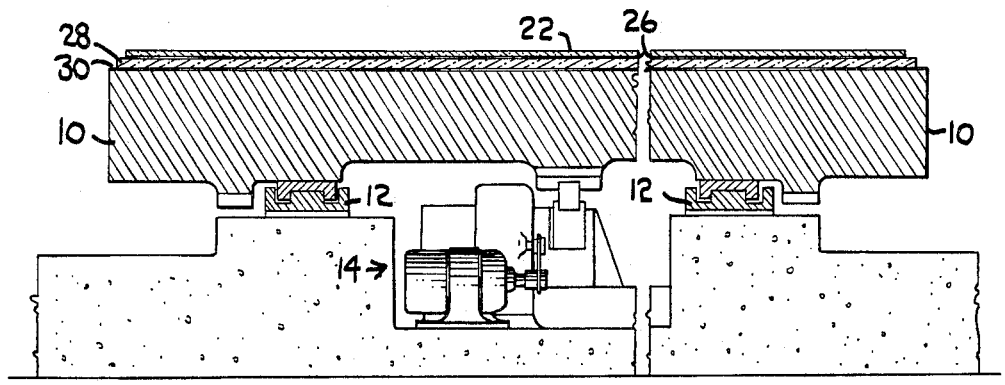
FIG. 2
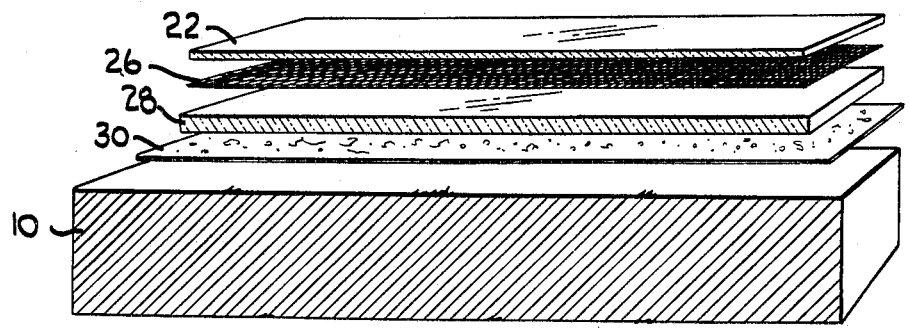
FIG. 3
INVENTOR
JOHN D. THOMPSON
BY
ATTORNEYS

3,488,895
METHOD FOR SURFACING GLASS
John D. Thompson, Saxonburg, Pa., assignor to PPG Industries, Inc., a corporation of Pennsylvania
Filed May 29, 1967, Ser. No. 643,307
Int. Cl. B24b 1/00
U.S. Cl. 51—283          4 Claims

ABSTRACT OF THE DISCLOSURE

A mesh material, such as nylon or silk mesh or "bridal veil," is placed between a bed of glass, ceramic or other material which can be ground similar to glass, which has been ground to flatness, and a sheet of glass to be ground and polished by abrasives. The glass bed is supported on a grinding table movable beneath grinding and polishing apparatus.

BACKGROUND OF THE INVENTION

This invention relates to improvements in the art of grinding and polishing glass by moving the glass on a support beneath moving grinding and polishing runners in the presence of abrasives. More specifically, this invention relates to improvements in supporting the glass to be ground and polished, making it possible to produce very thin glass sheets of improved thickness tolerances.

There are two basic processes for grinding and polishing glass. The first includes the steps of making a ribbon of glass, cutting the ribbon into discrete sheets or plates, placing each plate on a movable cast iron flat table comprising a rectangular car, coupling successive cars together and moving the cars along tracks beneath grinding runners and then beneath polishing runners. A thin layer of plaster of Paris is spread on the tables to receive the glass plates and holds the plates in proper position. When one surface is ground and polished, the glass plate is removed, the plaster is removed from the glass and the tables, the glass inverted and placed on another or the same table with a new bed of plaster thereon and again conveyed beneath the grinding and polishing means. The grinding and polishing line may be a mile or more in length. In the grinding step, the glass is ground by a sand-water slurry by cast iron runners, and in the polishing step, the glass is polished by a rouge-copperas-water slurry by hair felt pads.

In the other known method, a continuous ribbon of glass is ground by twin grinding means and is thereafter cut into discrete sheets for polishing. The polishing is accomplished by placing the plates of glass on similar tables and conveying the tables beneath polishing runners for polishing with the rouge-copperas-water slurry. A woven cloth having a nap separates the glass from the tables and maintains the plates in proper position for polishing. Here, also, the glass must be inverted so as to polish both surfaces thereof.

In both of these known processes, it is difficult, if not impossible, to precision grind and polish very thin glass, as for example, glass of a final thickness less than one-eighth inch and a tolerance of ±.010 or less. One of the main reasons is the cast iron tables which are used. Because of the heat generated during grinding and polishing, the tops or beds of the tables become non-planar with respect to the plane of the grinding and polishing means.

Descriptions of various grinding and polishing procedures can be found in U.S. Patents No. 2,597,182, issued May 20, 1952 to G. E. Rickner et al.; 2,736,996, issued Mar. 6, 1956 to E. Hoyet; 3,066,453, issued Dec. 4, 1962 to G. E. Kunkle et al.; and 3,228,150, issued Jan. 11, 1966 to F. Moser et al. The latter patent describes the use of a felt cloth for retaining the glass in position for polishing.

SUMMARY OF THE INVENTION

According to the teachings of this invention, it has been found possible to use conventional, single side surfacing techniques and to produce ground and polished plate glass in a thickness not heretofore possible with a thickness tolerance of less than ±.010 inch. This is possible by using a secondary bed for supporting the glass and in order to maintain the glass free of defects which occur when placed in contact with such felt cloth, as is taught by the prior art, the glass is bedded on a mesh-like material, such as nylon or silk mesh, bridal veil, fiber glass screening, etc. Any material having a 0.250 to .010 mesh is suitable; preferably material having a .010 mesh is desired. Perforated material can also be used, so long as the perforations are in the same range and such materials are included when the expression "mesh-like" is used. Generally the mesh or perforated material is 0.125 to .001 inch in thickness, usually it is on the order of .004 inch thick.

The secondary bed is also of great importance because of its spatial relationship with the grinding and polishing runners.

In accordance with this invention, a relatively thick plate glass, ceramic or other material which can be surfaced in a manner similar to glass, such as marble, slate, etc., as on the order of ½ to 1½ inches thick or more, is bedded on a conventional grinding and polishing table by a thin layer of plaster of Paris or epoxy cement. This is then run through the grinding line to level the glass plate, so that a substantially flat surface is presented by the plate which is in the same plane as the grinders. Then a mesh material on the order of .004 inch in thickness, such as nylon or silk mesh, is placed over the thick ground glass plate or bed plate and is wetted and smoothed thereover as by rolling. The mesh material can be attached at various places by pressure sensitive tape if necessary; however, such attachment is used only if necessary. A previously ground and polished or a rough rolled plate of glass having a thickness on the order of 0.180 inch, the former being produced from a rough rolled stock of 0.220 inch, is laid on the mesh which is on the ground bed plate. The glass plate to be ground and polished is wedged into desired position. The assembly of table, bed plate, mesh and glass plate is conveyed beneath the same grinding runners that were used to grind the bed plate, and thereafter under polishing runners. The glass, after being ground and polished on one side, is turned over and then ground and polished on the other. The resultant thickness of the glass, after sufficient work has been expended, can be on the order of .110 inch±.003 inch.

Attempts have been made previously to grind the metal tables sufficiently flat to produce this thickness plate glass; however, it has been found that the metal of the tables expands differentially from the heat generated in the process and becomes distorted. The metal is difficult to grind flat enough for the purpose. The bed plate, however, can be so ground, and because it is ground by the same runners as will be processing the glass laid thereon, it is planar with respect to those runners and will so maintain the glass. The bed plate serves to at least partially insulate the metal from the heat and is not distorted from its planar condition.

For each table, a bed plate must be prepared according to the steps outlined above, and periodic resurfacing, as on the order of once a month, maintains the bed plates in condition for use.

BRIEF DESCRIPTION OF THE DRAWINGS

FIG. 1 is a plan view of a typical grinding and polishing line,

FIG. 2 is a transverse sectional view of the grinding and polishing line of FIG. 1, with the runners, either grinding or polishing, omitted for clarity, and FIG. 3 is an exploded, partial view showing the assembly of various parts for practicing this invention.

DESCRIPTION OF THE PREFERRED EMBODIMENT

Referring now to the drawings in FIGS. 1 and 2, there is shown a grinding and polishing line having a plurality of cast iron tables 10 movable along tracks 12, being driven by driving means generally indicated at 14, the details of which will not be described because such means is conventional in the art. The tables 10 are moved in the direction of the arrows in FIG. 1, indicated at 16, beneath rotating grinding runners 18 and thereafter beneath rotating polishing runners 20.

The grinding runners 18 are generally constructed with cast iron lugs which contact the surface of the workpiece or plate of glass 22 and a slurry of sand and water is fed to the interface.

After grinding beneath the runners 18, the glass 22 passes beneath the circular rotating polishing runners 20. Each runner is provided with a plurality of polishing blocks 24 having felt pads adhered thereto for glass contact. The polishing blocks are free to rotate about their vertical axes. A polishing solution is fed to the pads, which solution may be rouge-copperas-water, a zirconium solution or other polishing solutions.

The glass 22 to be ground and polished is laid on a mesh material 26 spread over the table 10 and over a relatively thick bed plate 28, preferably glass, which in turn is adhered to the top of the table 10 by a layer 30 of plaster or epoxy cement. FIG. 3 shows an exploded view of the assembly in larger scale.

To begin operation, the bed plate 28 is laid on the table 10 with the adhering medium therebetween and is passed through the grinders, so as to insure a plane surface and a surface in the plane of the grinder runners. Thereafter, mesh material is laid on the bed plate, wetted thereon, and the glass 22 to be ground is laid thereon. Proper adjustment of the runner positions is made, as in the conventional operation, and the glass 22 is ground and polished in the conventional manner, one side at a time. The glass is, after one side is finished, turned over to finish the opposite side. It has been found that it is possible to precision finish the glass to a thickness tolerance of no more than and usually less than .010 inch, not before possible on the equipment.

What is claimed is:

1. In the process of grinding and polishing glass in which glass is supported on a movable table and passed beneath, first, a contacting grinding and, second, a contacting polishing means having a working plane in the presence of an abrasive, the improvement comprising,
   placing a bed plate on said table,
   moving said bed plate on said table beneath said grinding means,
   grinding said bed plate so as to present a glass supporting surface in the same plane as the working plane of said grinding means,
   applying a relatively thin mesh covering on said ground bed plate,
   supporting a glass sheet on said covering,
   moving said supported glass sheet beneath said grinding and polishing means and,
   then grinding and polishing said glass sheet while so supported.

2. In the process of claim 1, the step of selecting the bed plate from the group consisting of glass, ceramic, marble and slate.

3. In the process of claim 1, the step of selecting the mesh covering from the group consisting of nylon mesh, silk mesh, bridal veil, fiber glass screening, knit paper and perforated plastic sheeting.

4. In the process of claim 3, the step of selecting the mesh covering with a 0.250 to 0.001 mesh.

References Cited

UNITED STATES PATENTS

| | | | |
|---|---|---|---|
| 178,403 | 6/1876 | Brockman | 51—240 |
| 497,115 | 5/1893 | Brockman | 51—240 |
| 1,815,547 | 7/1931 | Byrnes | 51—240 X |
| 1,911,221 | 5/1933 | Blair | 51—240 X |
| 2,156,699 | 5/1939 | Owen | 51—240 |
| 2,597,182 | 5/1952 | Rickner et al. | 51—283 |
| 3,066,453 | 12/1962 | Kunkle et al. | 51—283 X |

FOREIGN PATENTS

| | | |
|---|---|---|
| 349,928 | 6/1931 | Great Britain. |

HAROLD D. WHITEHEAD, Primary Examiner